Dec. 22, 1970   E. R. STEELE   3,550,129
SATELLITE AIDED VEHICLE AVOIDANCE SYSTEM
Filed March 28, 1969   8 Sheets-Sheet 1

INVENTOR
ERNEST R. STEELE

BY
ATTORNEYS

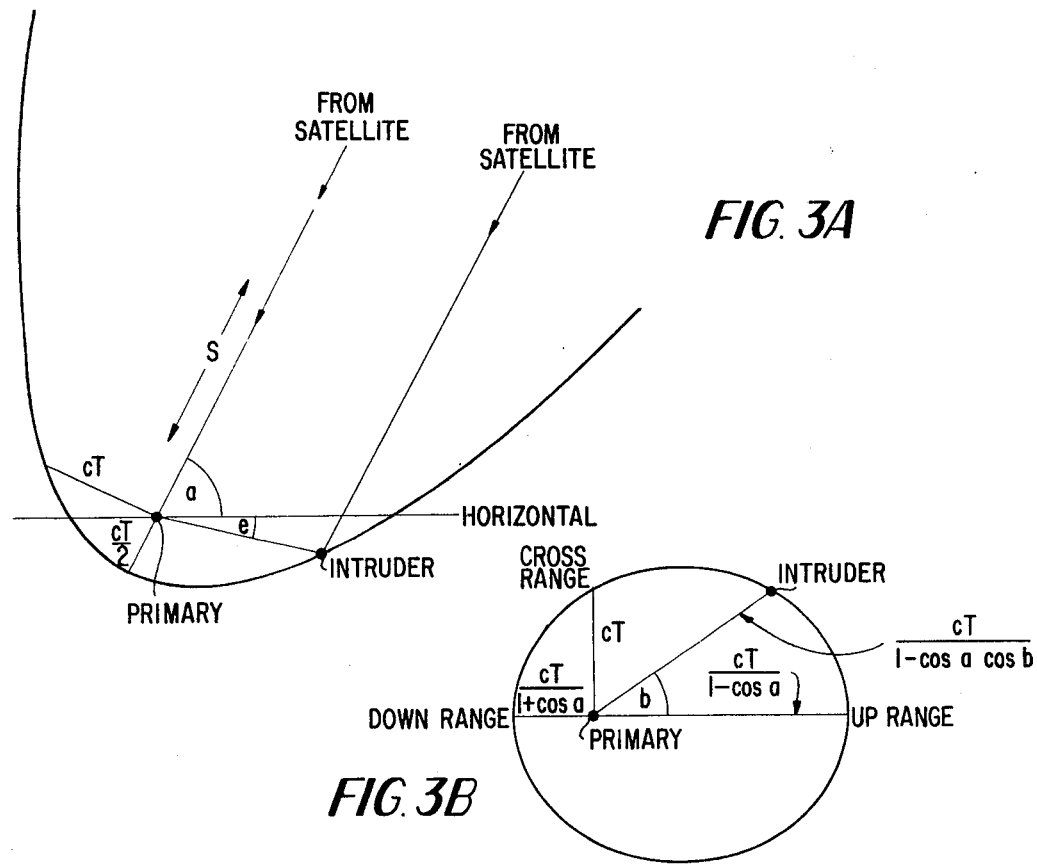
FIG. 3A
FIG. 3B
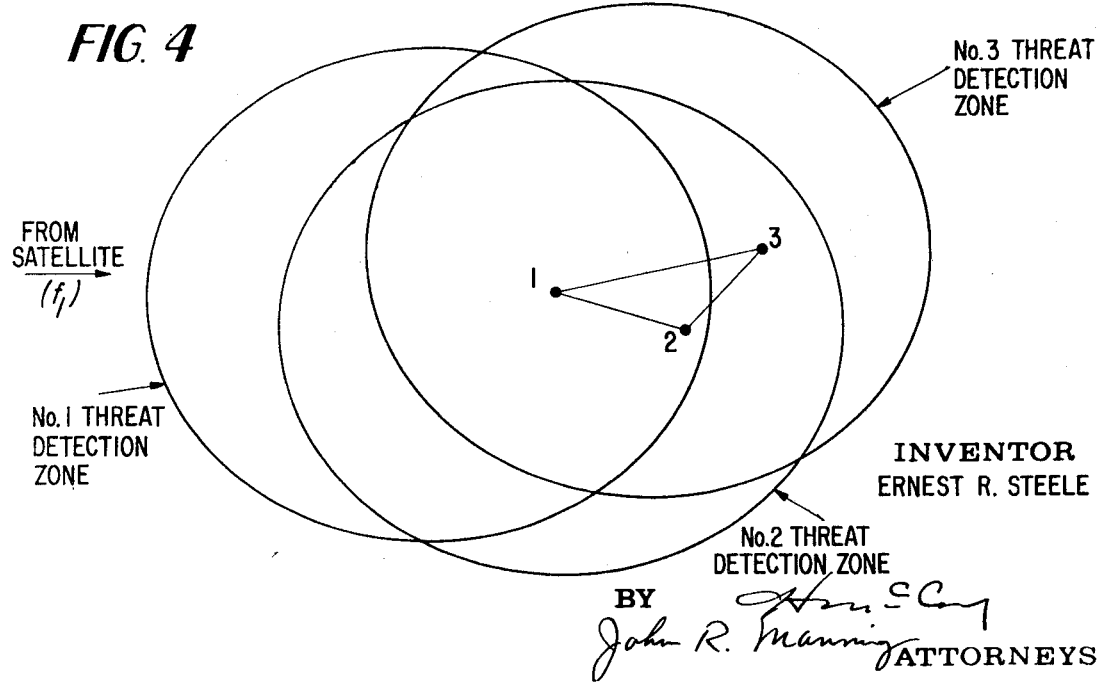
FIG. 4

Dec. 22, 1970   E. R. STEELE   3,550,129
SATELLITE AIDED VEHICLE AVOIDANCE SYSTEM
Filed March 28, 1969   8 Sheets-Sheet 4

INVENTOR
ERNEST R. STEELE
BY
ATTORNEYS

Dec. 22, 1970  E. R. STEELE  3,550,129
SATELLITE AIDED VEHICLE AVOIDANCE SYSTEM
Filed March 28, 1969  8 Sheets-Sheet 5

INVENTOR
ERNEST R. STEELE
BY
ATTORNEYS

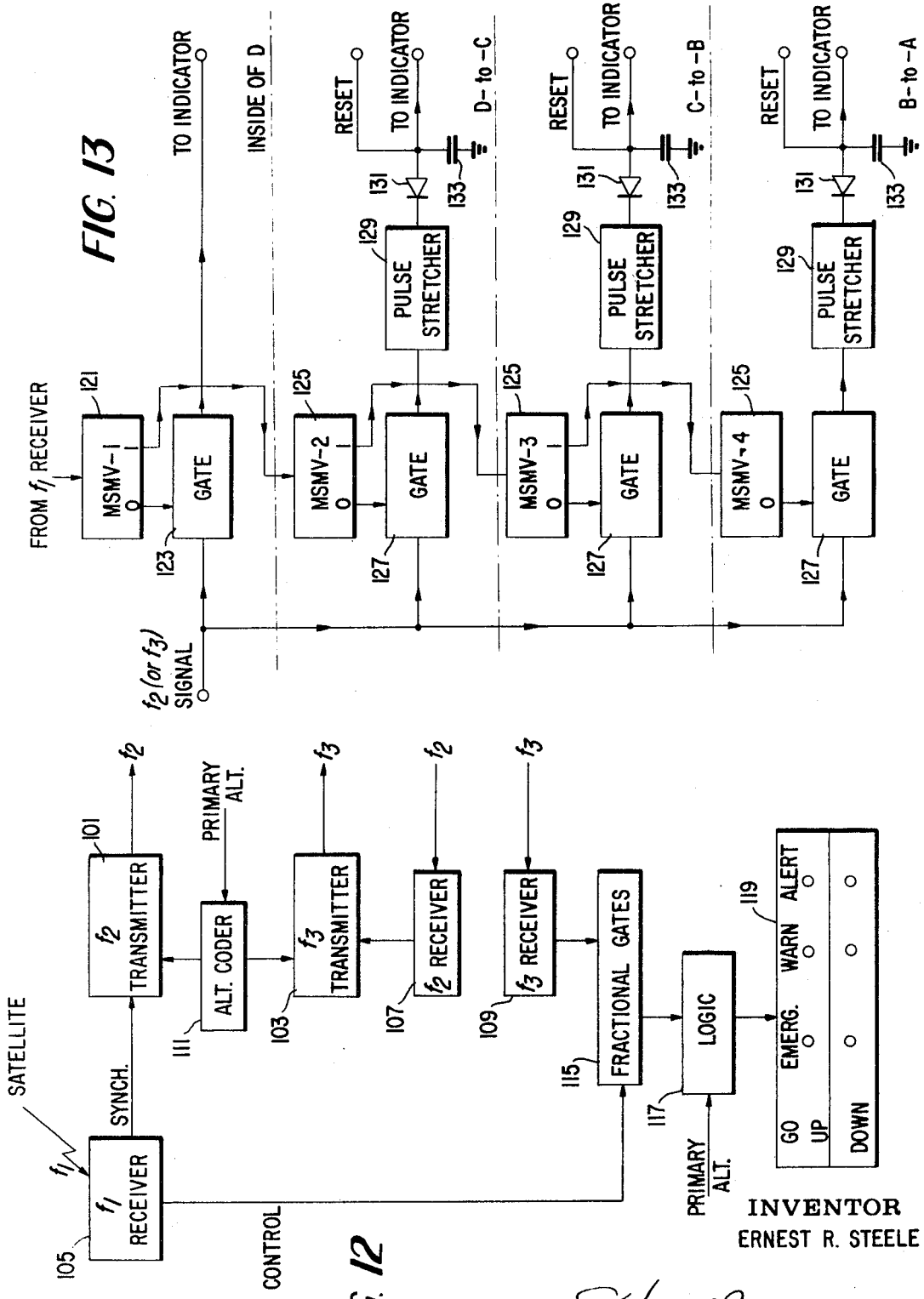

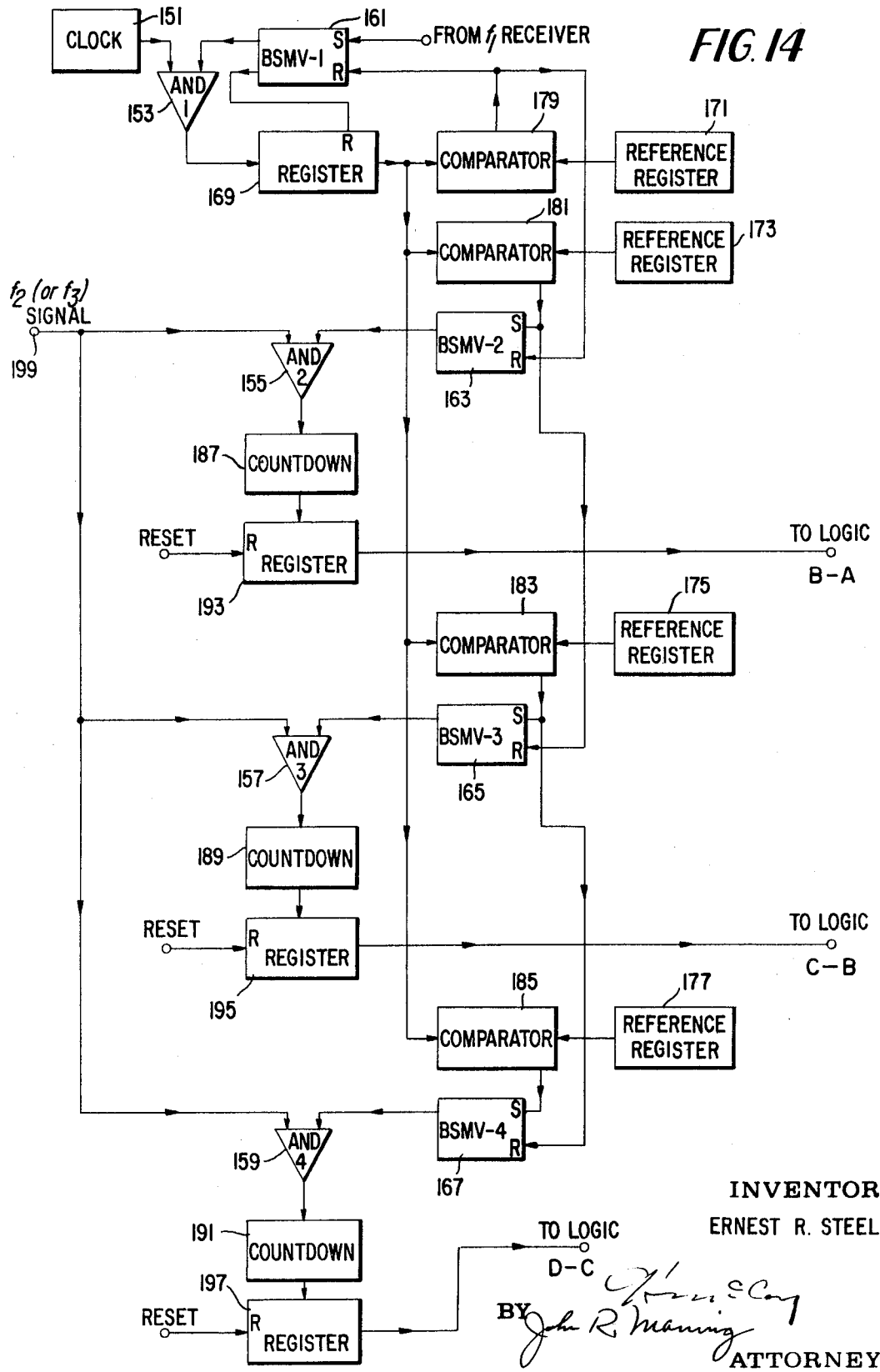

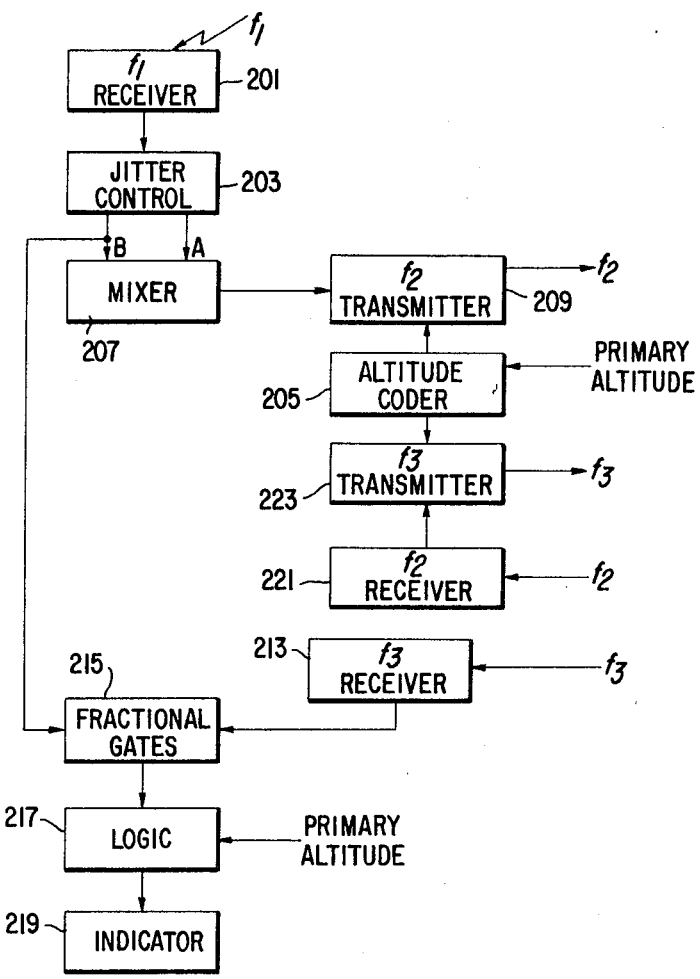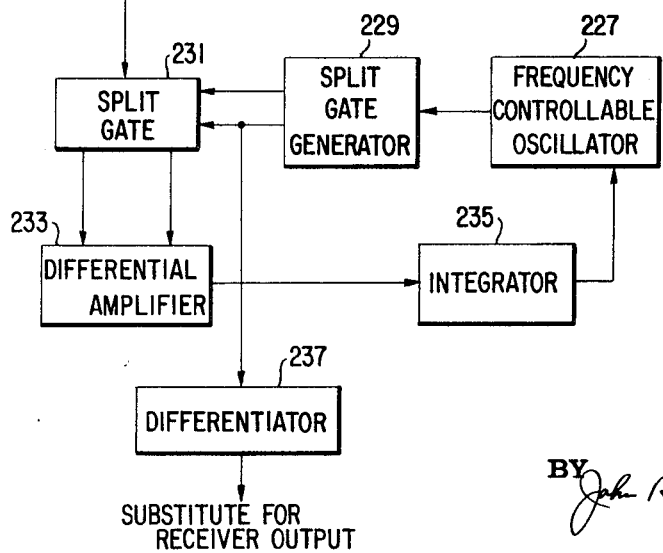

United States Patent Office 3,550,129
Patented Dec. 22, 1970

3,550,129
SATELLITE AIDED VEHICLE
AVOIDANCE SYSTEM
Ernest R. Steele, Belmont, Mass., assignor to the United
States of America as represented by the Administrator
of the National Aeronautics and Space Administration
Filed Mar. 28, 1969, Ser. No. 811,542
Int. Cl. G01s 5/02
U.S. Cl. 343—112
42 Claims

ABSTRACT OF THE DISCLOSURE

This disclosure describes a method of and an apparatus for warning a pilot of an aircraft of the proximity of another aircraft. The method comprises the steps of: transmitting a repetitive synchronizing signal from a satellite to aircraft; receiving said synchronizing signal by said aircraft generating a response signal by said aircraft in response to said synchronizing signal; opening a gate in said aircraft in response to said synchronizing signal; and, closing said gate after a predetermined time that establishes a threat detection zone to prevent the passage of a response signal through said gate from any aircraft that is outside of the thus established threat detection zone. The apparatus comprises a system including a satellite for transmitting a synchronizing signal and means onboard the aircraft for receiving said synchronizing signal. Means are also included onboard said aircraft for generating a response signal in response to said synchronizing signal and for opening a gate upon the receipt of said synchronizing signal for receiving said response signal. The gate is maintained open for a predetermined period of time that establishes a threat detection zone so that a response signal from another aircraft passes through the gate only if the response signal is received during the predetermined period of time. The received response signal is applied to an indicator to indicate the proximity of the other aircraft or is used to compute the threat of collision and derive a display of a suitable avoidance maneuver.

The invention described herein was made by an employee of the United States Government and may be manufactured and used by or for the Government for governmental purposes without the payment of any royalties thereon or therefor.

BACKGROUND OF THE INVENTION

In recent years, the use of aircraft as a transportation medium has become extremely widespread, resulting in a tremendous growth of private, commercial, and military aircraft. And, as the number of aircraft has increased, the probability of mid-air collisions has also increased. Because the aircraft can receive a collision from numerous angles, that are out of the view of the pilot, even the most observant pilot is subject to the possibility of a mid-air collision. Even when another aircraft is located in what is normally an observable region, it may be obscured by clouds, fog, or haze, for example. Hence, it is desirable to provide a method of and apparatus for aiding pilots by warning them of the approach of intruding aircraft. Receipt of significant information about the intruder and a logical determination of a suitable avoidance maneuver is also desirable.

The prior art has, to some extent, attempted to solve the problem of mid-air aircraft collisions. It has proposed various methods of and apparatus for detecting the possibility of a mid-air collision so that the pilots of the aircraft can be warned in time to take evasive action. For example, complex radar systems, either mounted on the aircraft or located on the ground, have been proposed and are in use. The major disadvantages of these methods and apparatus is their complexity and less than adequate performance, making their use subject to failure. In addition, their complexity makes them expensive. Hence, in addition to providing a method of an apparatus for aiding in the prevention of mid-air collisions, it is also desirable to provide a method and apparatus that is relatively uncomplicated and low in cost. While these are primary requirements, the method and apparatus should also be sufficiently versatile so that its performance and cost can be varied over a range that allows its use on small, inexpensive aircraft as well as large, expensive aircraft depending upon the quality of protection and sophistication desired.

In addition to the foregoing disadvantages, the prior art methods and apparatus have other disadvantages. One outstanding disadvantage is that warning or collision aid signals from non-intruding aircraft interfere with signals from intruding aircraft so as to prevent the interpretation of the signals. To avoid this interference some prior art systems use time-frequency methods requiring the carrying of ultra stable timing devices, such as atomic clocks or precision oscillators to establish assigned time slots for transmission. These devices or clocks require frequent re-synchronization by primary synchronizing sources, the end result being that the equipment is expensive and complex. Because time-frequency systems avoid interference by assigning different frequencies or time of transmission to each aircraft, the number of aircraft that can use the system is limited. Other prior art systems do not discriminate against signals from aircraft that are beyond a reasonable threat range. This lack of discrimination results in confusion between signals from non-intruding aircraft and signals from intruding aircraft. Another method and apparatus uses signals reflected from the ground, however, these signals are unreliable because of terrain irregularities. It will be appreciated from the foregoing discussion of the disadvantages of the prior art, that the prior art methods and apparatus are either inadequate in performance or they are extremely complex and expensive which limits their widespread use.

Some prior art systems have attempted to reduce the complexity by utilizing a simple gating approach wherein one aircraft sends out an interrogating signal and at the same time opens an internal gate. If a response signal is received within a predetermined time period, it passes through the gate. If the response signal is not received within the predetermined time period, it is not passed through the gate. In this manner, direct response signals to primary aircraft from aircraft outside of a set threat range are eliminated. This last noted prior art method has failed to provide the desired performance because of signal confusion. More specifically, prior art gated interrogator-transponder collision avoidance systems received too many responses. Because each aircraft interrogated all other aircraft within range, the number of responses was proportional to the square of the number of aircraft. With more than a few aircraft within radio range, the system saturated and significant intruder signals could not be distinguished.

Therefore, it is an object of this invention to provide a method and apparatus for aiding a pilot of a vehicle, such as an aircraft, in avoiding a collision with another similar vehicle.

It is also an object of this invention to provide a method of and an apparatus for aiding a pilot of an aircraft in avoiding a mid-air collision that is effective in the presence of a large number of aircraft that are not significant collision threats.

It is also an object of this invention to provide a method of and an apparatus for warning a pilot of a possible collision that is operative using simple signal transmissions without address to any particular vehicle.

It is still another object of this invention to provide a method of and an apparatus for warning a pilot of a possible mid-air collision, that is suitable for use on small as well as large aircraft.

It is a still further object of this invention to provide a pilot warning method and apparatus that warns a pilot of a possible mid-air collision with more than one aircraft at the same time and which provides him with sufficient information upon which he can make an evaluation of the possible collision threat so that he can take appropriate evasive action or provides him with an indication telling him what action to take to avoid a collision.

It is yet another object of this invention to provide a pilot warning method and apparatus that is flexible in complexity and cost, suitable for use on a wide range of aircraft, and suitable for either providing sufficient information to the pilot about the intruding aircraft so that he can take evasive action or telling the pilot what type of evasive action to take to avoid a collision.

SUMMARY OF THE INVENTION

In accordance with a principle of this invention, a method of warning the pilot or operator of a vehicle, such as an aircraft of the proximity of another vehicle is provided. The method comprises the steps of: transmitting a synchronizing signal from a satellite to said vehicle; receiving said synchronizing signal by said vehicle; generating a response signal by said vehicle in response to said synchronizing signal; opening a receiving gate in said vehicle in response to said synchronizing signal; and, closing said gate after a predetermined period of time that establishes a threat detection zone to prevent passage of a response signal through said gate from any vehicle that is outside of the thus established threat detection zone.

In accordance with a further principle of this invention, the method includes the additional step of adding data representing certain information about the responding vehicle to the transmitted response signal.

In accordance with still another principle of this invention, the method includes the additional step of fractionally dividing the receiving gate of said vehicle to determine the time to projected collision.

In accordance with yet another principle of this invention, the signal from the primary aircraft in response to a satellite signal generates a further response signal aboard other aircraft which is then transmitted to the primary aircraft to indicate the distance between the other aircraft and the primary aircraft.

In accordance with still another principle of this invention, the method includes the additional steps of evaluating the threat and informing the pilot of the most suitable action to take to avoid a collision.

In accordance with a further principle of this invention, an apparatus for warning a pilot or operator of a vehicle, such as an aircraft, of the proximity of another vehicle is provided. The apparatus comprises a system including a satellite for transmitting a synchronizing signal and means onboard vehicles for receiving said synchronizing signal. Means are also included onboard each of said vehicles for generating a response signal in response to the synchronizing signal and for opening a gate for receiving said response signal upon receipt of the synchronizing signal. The gate is maintained open for a predetermined period of time that is related to a desired threat detection zone so that a response signal passes through the gate if the response signal is recived during the predetermined period of time. The received response signal passing through the gate is applied to an indicator to indicate the presence of another vehicle within the threat detection zone.

In accordance with another principle of this invention, the apparatus includes a fractional gating means for fractionally gating the response signal to determine the time to a projected collision.

In accordance with a still further principle of this invention, the apparatus includes means for warning the pilot of the direction of the intruding aircraft so that evasive action can be taken.

In accordance with still another principle of this invention, the apparatus comprises a means for transmitting a further response signal by each aircraft upon receipt of the first response signal. With this information, the aircraft transmitting the first response signal and receiving the second response signal within a receiving gate that establishes the threat detection zone can determine the exact range between the two aircraft.

In accordance with an alternative principle of this invention, an indication means is provided for telling the pilot what action to take to avoid a collision.

It will be appreciated from the foregoing description that the invention provides a relatively uncomplicated and potentially inexpensive method of and apparatus for warning a pilot or operator of a vehicle, such as an aircraft, of the possibility of an imminent collision so that he can take the appropriate evasive action. Alternatively, the method and apparatus tells the pilot what action to take to avoid the danger of a collision.

If the method and apparatus are used with an aircraft, a pilot is involved; however, the invention is not limited to use onboard an aircraft. It can be used on ships at sea or in other vehicular traffic situations. By utilizing a synchronizing satellite with responding transmitters and receivers onboard the vehicles, a relatively uncomplicated method and apparatus are provided. Specifically, the invention in its simplest embodiment requires that each vehicle include a receiver for receiving synchronizing signals, a transmitter for transmitting response signals, and a gated receiver of response signals so that response signals from other vehicles can be received only during a predetermined period of time after receipt of a synchronizing signal. The period of time being chosen in accordance with the expected relative velocity of the intruder vehicles. The gate duration determines the threat detection region that will be covered. By utilizing the satellite for synchronization, in this manner, each threat detection region has the shape of an ellipsoid segment, bounded vertically by the altitude capability of the vehicles. The warning zone is elliptical in shape for surface vehicles or ships. Each participating aircraft is at one focus of its own ellipsoid; the satellite is at the other focus. The elevation angle of the satellite determines the shape of the warning zone.

In addition to providing a basic system, the invention also provides a flexible system. By increasing the complexity of the inventive apparatus and the method thereof, the invention can be utilized to transmit information on the altitude, identity, maneuver intent, for example, of one aircraft to another aircraft in the response to the synchronizing signal. Further, the receiving gate can be divided in such a way that the time to the projected collision may be easily determined and indicated. Alternately, the time to collision can be used in an automatic threat evaluation, which also uses other information such as intruder altitude, providing a display indication of the most suitable avoidance maneuver. Hence, an aircraft can determine more precisely whether or not evasive action is necessary. In addition, the method can include the step of sending another signal in response to the initial response signal so that the exact range between the aircraft can be determined by each aircraft. In this case, the threat detection regions are spherical for aircraft and circular for surface craft. Consequently, it will be appreciated that the invention is versatile and can be used in less complicated form on small, inexpensive aircraft or a more complicated form on large, expensive aircraft. The complexity of the system is determined by the amount of information desired.

BRIEF DESCRIPTION OF THE DRAWINGS

The foregoing objects and many of the attendant advantages of this invention become more readily appreciated as the same becomes better understood by reference to the following detailed description when taken in conjunction with the accompanying drawings wherein:

FIGS 3A and 3B are pictorial diagrams also illustrating the general concept of the invention;

FIG. 4 is a pictorial diagram illustrating the horizontal warning or threat detection zones of three aircraft receiving synchronizing signals from a satellite;

FIG. 12 is a block diagram illustrating a further alternative embodiment of the invention;

FIG. 13 is a block diagram illustrating an analog apparatus for fractional gating;

FIG. 14 is a block diagram illustrating a digital apparatus for fractional gating;

FIG. 15 is a block diagram illustrating an apparatus for jittering response signals and gates to suppress spurious signals; and FIG. 16 is a block diagram illustrating a controllable frequency oscillator system used to average synchronizing pulses to increase the available intruder resolution.

DESCRIPTION OF THE PREFERRED EMBODIMENTS

Figure 1:
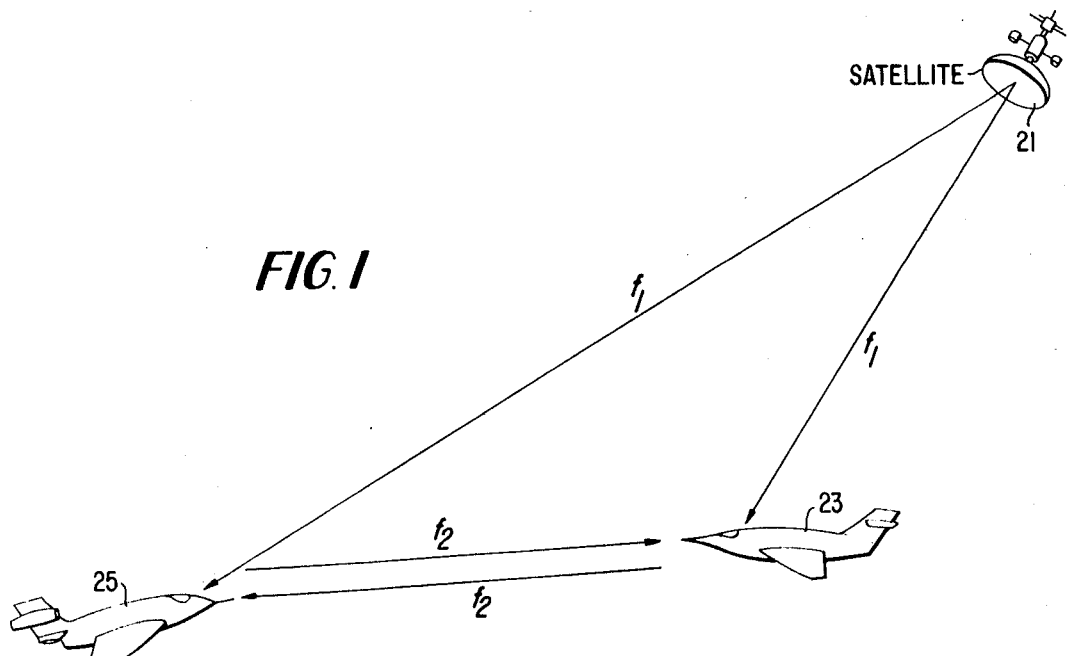
FIG. 1 is a pictorial diagram illustrating the general concept of the invention.

FIG. 1 is a pictorial diagram illustrating the method of the invention. A satellite 21 in orbit around the earth transmits repetitive synchronizing signals at frequency $f_1$ to first and second aircraft 23 and 25. For ease of discussion, the signals will be referred to as pulses and first aircraft 23 is herein referred to as the "primary" aircraft and the second aircraft 25 is referred to as the "intruding" aircraft. In response to each synchronizing signal $f_1$ (for example, for each pulse in a 200 pulse per second train), each aircraft generates a response signal $f_2$. In addition to generating a response signal, when each aircraft receives a synchronizing signal, it also opens a gate which allows the response signal from the other aircraft to be received by it. The gate is only maintained open for a predetermined period of time; hence, if the response signal is not received within the predetermined period of time, it does not pass through the gate because the gate is closed. By controlling the time of the gate closing, a threat detection zone is determined. If an intruding aircraft is in the threat detection zone, it is detected by the primary aircraft, and if the intruding aircraft is outside of the threat detection zone, it is not detected.

It will be appreciated from the foregoing description of FIG. 1 that the method of the invention comprises the steps of: transmitting a synchronizing signal from a satellite to aircraft; receiving said synchronizing signal by said aircraft; generating a response signal by said aircraft in response to said synchronizing signal; opening a gate in said aircraft in response to said synchronizing signal; and, closing said gate in said aircraft after a predetermined period of time related to the desired threat detection zone to prevent the passage of any response signal through said gate received from another aircraft after said predetermined period of time has passed as would be the case, if the other aircraft were outside of the thus established threat detection zone.

Figure 2:
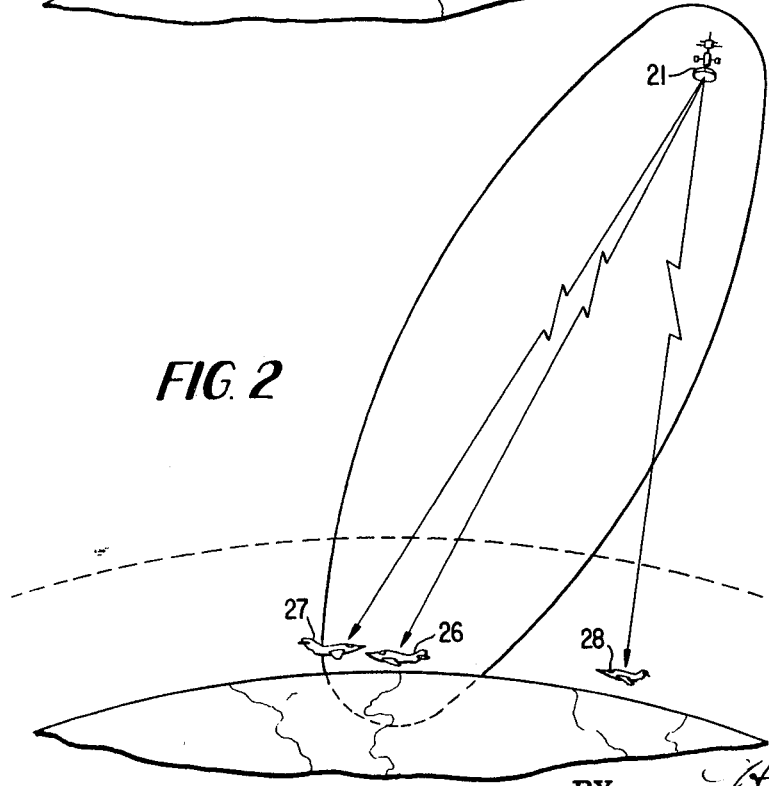
FIG. 2 is a pictorial diagram also illustrating the general concept of the invention.

FIG. 2 is another pictorial diagram illustrating the method of the invention wherein three aircraft 26, 27, and 28 are receiving interrogating signals ($f_1$) from a satellite. Aircraft 26 is the primary aircraft. Aircraft 27, an intruder, is within the threat detection zone of aircraft 26, because it is near enough for its $f_2$ signal to arrive within the $f_2$ receiver gate of aircraft 26. Aircraft 28 is not an intruder. Aircraft 28 is too far from aircraft 26 for its $f_2$ signal to reach aircraft 26 before aircraft 26 closes its gate.

The ellipse shown is a section through an ellipsoid and represents the limit of position for an aircraft to have its $f_2$ signal arrive within the gate of aircraft 26. The upper dashed line represents the altitude capability of the aircraft and is thus also the upper boundary of the threat detection zone.

FIG. 3A is a vertical cut of the lower portion of an ellipsoid such as illustrated in FIG. 2. FIG. 3B is a horizontal cut of such an ellipsoid. FIGS. 3A and 3B illustrate the geometrical relationships between the primary aircraft and intruding aircraft. Using these geometrical relationships a mathematical formula relating to the range between the primary and the intruding aircraft to the time of a received response pulse can be derived. The formula is as follows:

$$R = \frac{cT\left(S + \frac{cT}{2}\right)}{S(1 - \cos a \cos b \cos e - \sin a \sin e) + cT}$$

where:

R = Distance to intruder position locus
T = Signal delay ($f_2$ rel. to $f_1$)
S = Distance to satellite
$a$ = Satellite elevation angle
$b$ = Intruder azimuth (rel. to sat.)
$c$ = Speed of light
$e$ = Intruder elevation angle Because S is considerably larger than $cT$ or $cT/2$ for practical distances, the latter terms can be neglected in the foregoing equation. Then, S can be cancelled from the upper and lower terms so that the following equation results:

$$R = \frac{cT}{1 - \cos a \cos b \cos e - \sin a \sin e}$$

It will be appreciated from FIGS. 2, 3A and 3B and from the foregoing equations that the threat zone defined by the invention is basically a paraboloid section bounded at the top by the altitude capability of the intruder.

FIG. 4 is a pictorial diagram illustrating three aircraft and their threat detection zones. From viewing FIG. 4 it will be appreciated that aircraft 2 is in aircraft 1's threat detection zone, while aircraft 3 is outside of aircraft 1's threat detection zone. However, both aircraft 1 and aircraft 3 are inside of aircraft 2's threat detection zone. Similarly, aircraft 1 and aircraft 2 are inside of aircraft 3's threat detection zone.

Figure 5:
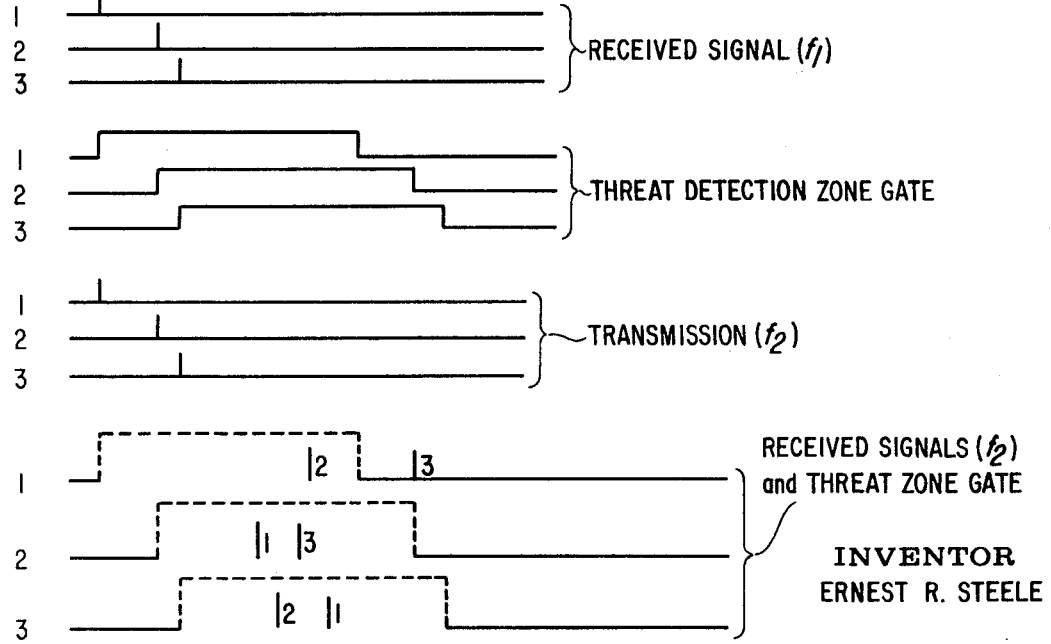
FIG. 5 is a time sequence diagram for the zone configuration illustrated in FIG. 4.

FIG. 5 is a timing diagram illustrating the sequence of events for the FIG. 4 aircraft arrangement. In FIG. 4, the $f_1$ synchronizing signal from the satellite is approaching all of the aircraft from the left side of the figure. Hence, the synchronizing signal is received by aircraft 1 prior to being received by aircraft 2 and 3.

The time of receipt of the signals by the aircraft is illustrated on the line designated "time" of FIG. 5. That is, aircraft 1 receives the $f_1$ signal at $t_1$, aircraft 2 receives it at $t_2$ and aircraft 3 receives it at $t_3$. The time of reception of the synchronizing signal is also indicated on the first set of the three lines designated "received signals ($f_1$)".

Upon receipt of an $f_1$ synchronizing interrogating signal by an aircraft a gate is opened in the aircraft. Each gate stays open for a predetermined period of time. In FIG. 5 the gate durations are made equal for the three aircraft. The time and length of opening of the gates of the three aircraft are illustrated on the second set of three lines of FIG. 5 designated "threat zone gate." Simultaneously, with the opening of the threat zone gates each aircraft transmits a response signal $f_2$. The time of transmission of $f_2$ from each aircraft is illustrated on the third set of three lines of FIG. 5 designated "transmission ($f_2$)." The transmitted $f_2$ signals of each aircraft are received by the other two aircraft with delays due to the positions. However, only those received within an open gate period are processed further. A comparison of gate open time and $f_2$ received pulse time is provided in the fourth set of lines of FIG. 5 designated "received signals ($f_2$) and threat zone gate." This comparison indicates that aircraft 1 receives a response signal from aircraft 2 within its threat zone gate period, but does not receive one from aircraft 3 during the gate period. Aircraft 2 receives a response signal from both aircraft 1 and aircraft 3 during its gating period. Similarly, aircraft 3 receives a response signal from aircraft 1 and aircraft 2 during its gating period. Consequently, aircraft 1 is aware of aircraft 2 but is not aware of aircraft 3 while aircraft 2 and aircraft 3 are aware of aircraft 1 and 3 and aircraft 2 and 1, respectively. Hence, the elliptical character of the threat detection zones acts to reduce the probability that mutual intrusion will be detected simultaneously when the most simple embodiment of the invention is used, as may be the case for small aircraft.

Figure 6:
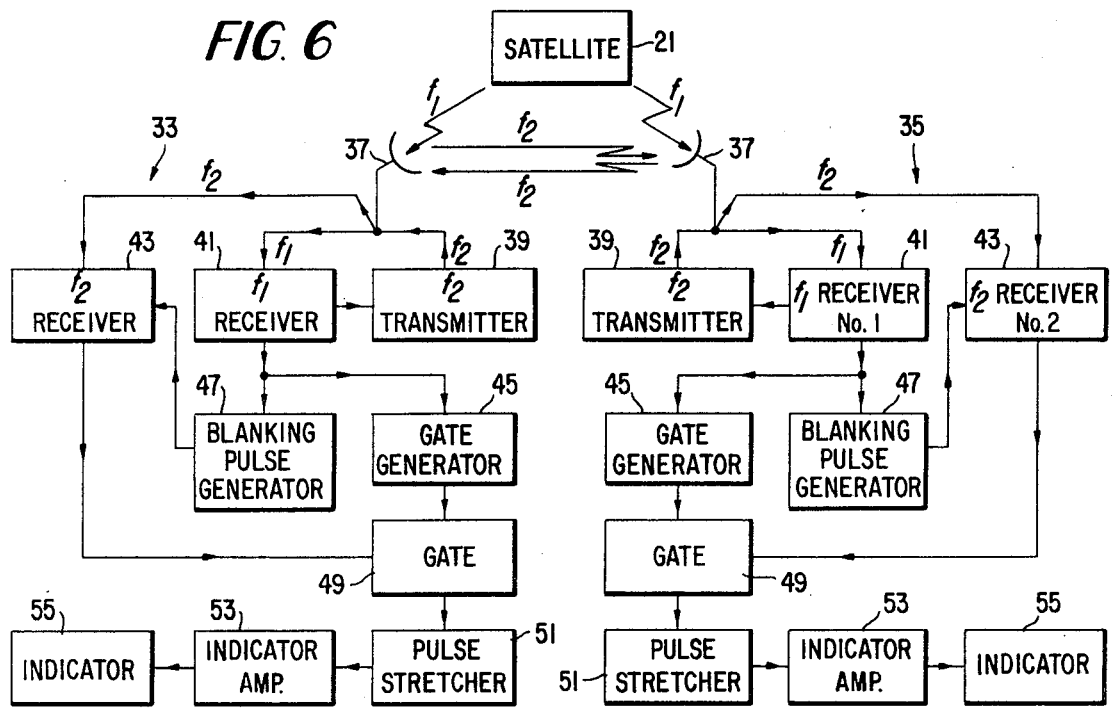
FIG. 6 is a block diagram illustrating one embodiment of the apparatus of the invention.

FIG. 6 is a block diagram illustrating one apparatus for carrying out the method of the invention. It is the most uncomplicated embodiment of the inventive apparatus herein described and comprises: the satellite 21; a primary aircraft's electronics 33; and an intruding aircraft's electronics 35. Each aircraft's electronics comprise: an antenna 37; an $f_2$ transmitter 39; an $f_1$ receiver 41; an $f_2$ receiver 43; a gate generator 45; a blanking pulse generator 47; a gate 49; a pulse stretcher 51; an indicator amplifier 53; and an indicator 55. The antenna 37 is coupled by suitable coupling means (not shown) to the output of the $f_2$ transmitter 39 and the inputs of the $f_1$ and the $f_2$ receivers 41 and 43.

The $f_1$ receiver 41 has three outputs. One output is connected to the input of the $f_2$ transmitter 39; the second output is connected to the input of the gate generator 45; and, the third output is connected to the input of he blanking pulse generator 47. The output of the blanking pulse generator 47 is connected to a blanking input of the $f_2$ receiver 43. The output of the gate generator 45 is connected to a control input of the gate 49. The output of the $f_2$ receiver 43 is connected to the signal input of the gate 49. The output of the gate 49 is connected through the pulse stretcher 51 and the indicator amplifier 53 to the input of the indicator 55.

In operation, the satellite 21 transmits an $f_1$ synchronizing signal, which may be a pulse, to both aircraft. The $f_1$ pulse is received by the $f_1$ receiver 41. The $f_1$ receiver 41 generates a signal and applies the signal to the $f_2$ transmitter 39. In response to the signal from the $f_1$ receiver 41, the $f_2$ transmitter transmits an $f_2$ signal via the antenna 37. Simultaneously, with the transmission of the $f_2$ response signal, the $f_1$ receiver 41 applies a pulse to the blanking pulse generator 47 and to the gate generator 45. The gate generator generates a signal that opens the gate 49 while the blanking pulse generator generates a signal that blanks the $f_2$ receiver 43 during the period of time that the $f_2$ signal is being generated by the $f_2$ transmitter. Because the $f_2$ receiver 43 is blanked during the $f_2$ transmission period, it will not receive its own $f_2$ signal which could occur due to linking between the $f_2$ transmitter and the $f_2$ receiver via the antenna.

After the $f_2$ signal has been transmitted, the blanking pulse is ended and the $f_2$ receiver 43 is opened to pass $f_2$ pulses. That is, the $f_2$ receiver now receives and amplifies $f_2$ pulses transmitted by the intruding aircraft. The received pulses pass through the gate 49 if the gate generator is maintaining the gate open when the $f_2$ pulse is received. The setting of the gate generator 45 determines the period of time that the gate 49 is open, which as heretofore described, determines the extent of the threat detection zone. Hence, if an intruding aircraft is in the threat detection zone, the gate is open when the $f_2$ pulse from the intruding aircraft is received by the primary aircraft. The $f_2$ pulses are applied to the pulse stretcher 51. The pulse stretcher merely stretches the $f_2$ pulses and applies them through the indicator amplifier 53 to the indicator 55. Hence, if a pulse is received within the time the gate is open, the indicator amplifier applies a signal to the indicator which warns the pilot of the primary aircraft that there is an intruding aircraft within his threat detection zone.

It will be appreciated that FIG. 6 is a rather uncomplicated embodiment of the invention and only warns the pilot of the primary aircraft that an intruding aircraft is within his threat zone. It does not inform the pilot about the direction, exact range, speed, time to collision, altitude, etc., of the intruding aircraft. However, manual variation of the gate duration would inform the pilot of the changing situation and the rate of change. Also the use of a directional antenna for receiving $f_2$ signals could be used to determine the direction of the intruder. The more sophisticated embodiments of the invention as hereinafter described, provide part or all of this information or can evaluate the threat and indicate the most suitable avoidance maneuver.

Figure 7:
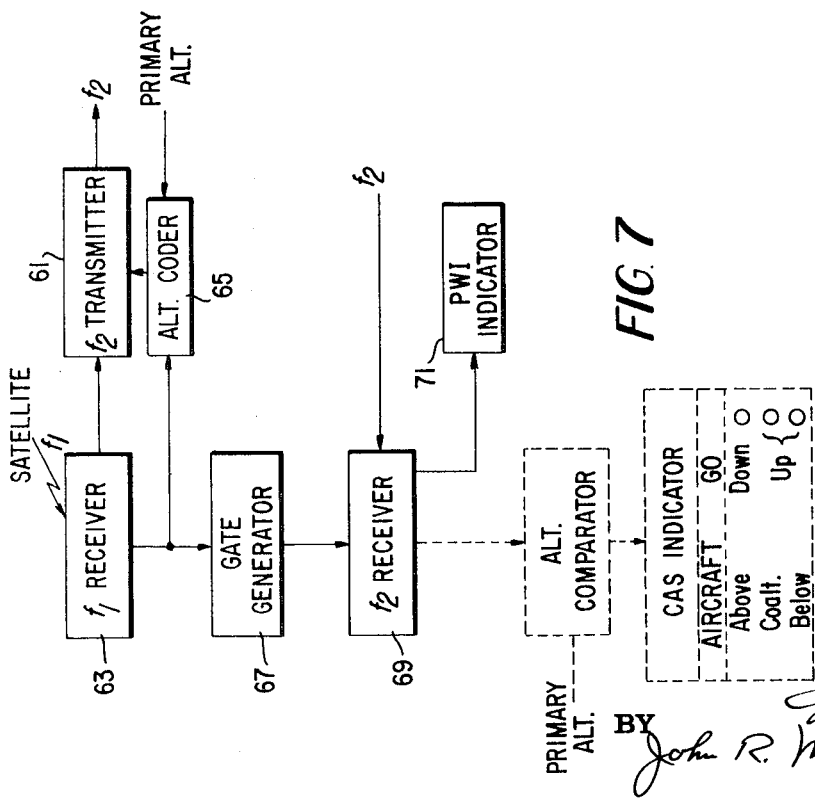
FIG. 7 is a block diagram illustrating an alternative embodiment of the invention.

FIG. 7 is a block diagram illustrating an alternative embodiment of the apparatus of the invention. The FIG. 7 embodiment provides the pilot of the primary aircraft with an indication of the altitude of the intruding aircraft as well as an indication that the intruding aircraft is in his threat detection zone. It will be appreciated that knowledge of the altitude of an aircraft in a threat zone is important in determining whether or not that aircraft may be on a collision course.

The apparatus illustrated in FIG. 7 comprises: an $f_2$ transmitter 61; an $f_1$ receiver 63; an altitude coder 65; a gate generator 67; an $f_2$ receiver 69; a proximity warning indicator (PWI) 71; an altitude comparator 73; and a collision avoidance system (CAS) indicator 75.

The altitude comparator 73 and the CAS indicator 75 are shown in dotted lines because, as hereinafter described, they are alternative to the PWI. The interrogating signal from the satellite is received by the $f_1$ receiver 63. The $f_1$ receiver generates control signals that are applied to: the $f_2$ transmitter 61; the altitude coder 65; and, the gate generator 67. The altitude coder 65 also receives a signal designating the altitude of the primary aircraft. The altitude coder codes the $f_2$ signal transmitted by the $f_2$ transmitter so that it contains data on the altitude of the primary aircraft. Binary pulse width coding of successive $f_2$ pulses can be used. Hence, the $f_2$ response signal transmitted by the primary aircraft not only indicates the presence of the primary aircraft, but also supplies altitude information about the primary aircraft to other aircraft.

The control signal applied by the $f_1$ receiver 63 to the gate generator 67 opens a gate in the receiver 69. The gate generator 67 applies a gating signal to the $f_2$ receiver 69 which opens that receiver so that it will detect and pass $f_2$ signals from intruding aircraft. After a predetermined period of time the gate period automatically ends, stopping passage of $f_2$ signals through the receiver 69. If an $f_2$ signal is received during that period of time that the gate is open, the received $f_2$ signal is passed through the gated receiver 69 to the PWI indicator 71 which then indicates that an intruding aircraft is in the threat detection zone of the primary aircraft.

It will be understood by those skilled in the art that the letters PWI stand for Proximity Warning Indicator or Proximity Warning Instrument. Hence, the PWI provides the pilot of the primary aircraft with information about an intruding aircraft. The pilot then adds to this information in any way he can and then makes a decision about what evasive action to take, if any. In contrast to a PWI system is a Collision Avoidance System (CAS). A CAS may receive the same information as a PWI system; however, rather than just indicating the information, it evaluates the threat against set thresholds of criteria and indicates to the pilot the proper avoidance maneuver and when to make the maneuver. An alternative CAS embodiment is illustrated by the portions of FIG. 7 lying inside of the dashed lines.

The dashed line portion of FIG. 7 includes the altitude comparator 73 that receives $f_2$ signals from the intruding aircraft via the $f_2$ receiver 69. The altitude comparator 73 also receives a second signal representing the altitude of the primary aircraft. The altitude comparator determines the difference of the two altitude signals and compares this difference to a set threshold value. If this difference is zero or less than the threshold, the comparator 73 determines and applies the appropriate relative altitude signal to the CAS indicator 75. The indicator 75 may be a simple light type indicator which indicates that the threat aircraft is above, below or at the same altitude as the primary aircraft. This same display can be interpreted as a command indication, providing a minimum CAS embodiment. Alternatively, the indicator could be more complex and also display the amount the intruding aircraft is above or below the primary aircraft.

It will be appreciated from the foregoing description that the embodiment of the invention illustrated in FIG. 7 provides more pilot information than the embodiment of the invention illustrated in FIG. 6. Specifically, the FIG. 7 embodiment not only indicates that an intruding aircraft is in the threat zone of the primary aircraft, but it also indicates whether or not the intruding aircraft is above, below or at the same altitude as the primary aircraft. Further, it indicates the most suitable avoidance maneuver.

It should be noted that FIG. 7 has been somewhat simplified to illustrate the differences between it and FIG. 6. More specifically, it will be appreciated that while blanking generators for receivers and other protective devices, such as diplexers, which are normally incorporated when transmitters and receivers at or near the same frequency are in the same installation could be used in the various embodiments of the invention (as illustrated in FIG. 6), they are not illustrated in all of the embodiments for purposes of simplicity.

Figure 8:
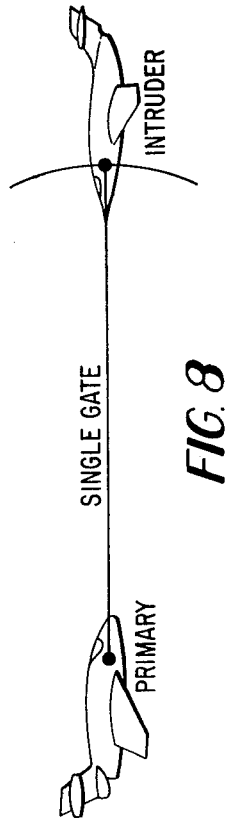
FIG. 8 is a pictorial diagram illustrating two aircraft on a collision course and is utilized to describe threat evaluation.

The time to a projected collision is generally accepted as a basic criterion of threat and is generally symbolized by the Greek letter "tau." Tau at the time when an intruder enters a threat zone, is proportioned to the number of intruder pulses (N) that would be received as the intruder passes from the edge of the threat zone to collision with the primary aircraft (gate period), with the proportionality constant being the reciprocal pulse repetition frequency (PRF). Consequently, tau=$N/PRF$. The problem with this formula is pictorially illustrated in FIG. 8. Specifically, FIG. 8 illustrates a single gate where tau is measured by counting the $f_2$ pulses from the edge of the threat zone to the location of the primary aircraft. Hence, by the time a count is made upon which to evaluate tau when the intruding aircraft was at the edge of the threat zone, the aircraft may have already collided. Obviously it is desirable to known tau much earlier.

Figure 9:
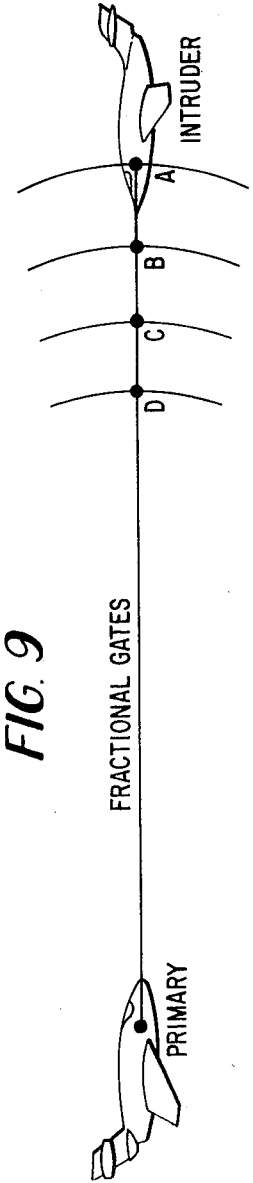
FIG. 9 is a pictorial diagram illlstrating two aircraft on a collision course and is utilized to describe fractional gating.

FIG. 9 illustrates pictorially a system wherein the gate period is fractionalized so that early and successive tau measurements can be made as the intruding aircraft approaches the primary aircraft. Specifically, tau is obtained periodically by counting the intruder pulses through successive gate sections (fractional gates) such as from A to B, B to C, and so forth, Tau at points A and B is determined by the following equations:

$$\text{Tua}_A = \frac{N_F}{PRF + F_G}$$

$$\text{Tau}_B = \frac{N_F(1-F_G)}{PRF \times F_G}$$

where:

$F_G$ = gate fraction = $\dfrac{\text{Fractional gate duration}}{\text{Total gate duration from start of full gate to end of fractional gate}}$ If the gate is divided into exponentially sized fractional gates based on the same fraction ($F_G$) the same proportionality constant applied to the count will give an updated tau wherever the intruder passes from one fractional gate to the next inner one. The term $1-F_G$ is included in the $\text{tau}_B$ equation above to make $\text{tau}_B$ current with the passage from the A to B fractional gate, rather than from entrance into the fractional gate A to B.

The $\text{tau}_B$ equation can be transposed to obtain the following interrelated equations:

$$\text{Tau}_B = \frac{N_F(1-F_G)}{PRF \times F_G}$$

$$F_G = \frac{N_F}{\text{Tau}_B \times PRF + N_F}$$

$$PRF = \frac{N_F(1-F_G)}{\text{Tau}_B \times F_G}$$

where, as stated above:
Tau=Time to projected collision
$N_F$=Pulse count in fractional gate
$F_G$=Gate fraction
PRF=Signal repetition frequency As an example of the foregoing relationships assume:

Tau=$N_F/64$ (a convenient 1/64 countdown)
$F_G$=0.2
Closing speed=1200 m.p.h.
then $$PRF = \frac{64(0.8)}{0.2} = 256$$

and the following table is formed:

| Fractional Gate No. | Range (mi.) | Gate limits (μsecs.) | $N_F$ | $N_F/64$=Tau (secs.) |
|---|---|---|---|---|
| A-B | 19.53 | 241.0 | | |
| B-C | 15.63 | 192.8 | 3,000 | 47 |
| C-D | 12.50 | 154.3 | 2,404 | 38 |
| D-E | 10.00 | 123.4 | 1,920 | 30 |
| E-F | 8.00 | 98.7 | 1,536 | 24 |
| F-G | 6.40 | 79.0 | 1,229 | 19 |
| G-H | 5.12 | 62.3 | 983 | 15 |
| H-I | 4.10 | 50.5 | 783 | 12 |
| | 3.28 | 40.4 | 630 | 10 |

It should be observed from the foregoing table that tau gets smaller and smaller as the threat becomes greater and greater.

Figure 10:
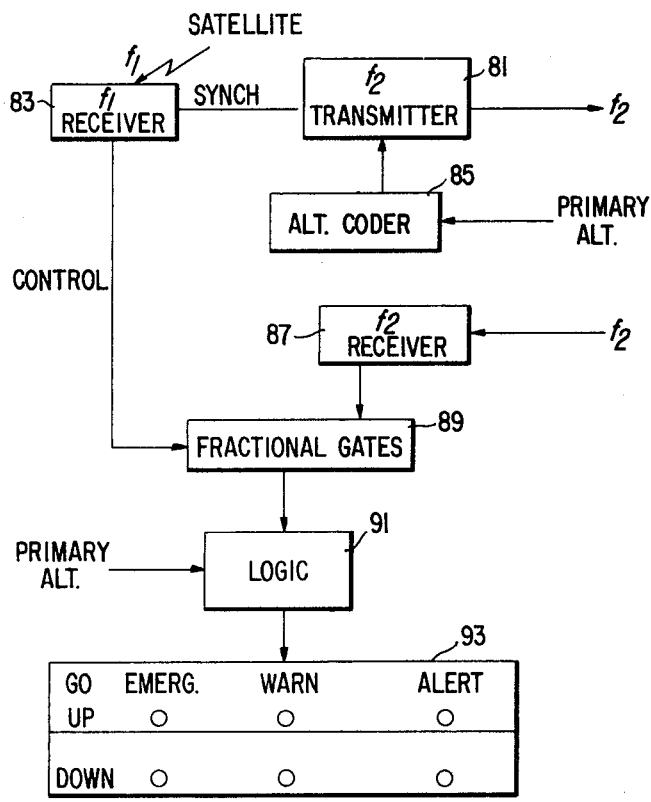
FIG. 10 is a block diagram illustrating still another embodiment of the invention.

FIG. 10 illustrates an embodiment of the invention utilizing altitude comparison and exponential fractional gating, (for measurement of tau by $f_2$ pulse counting, to evaluate the threat of collision and to determine and then indicate the most suitable avoidance maneuver. In addition, FIG. 10 illustrates a system for transmitting altitude information to intruding aircraft.

The embodiment of the invention illustrated in FIG. 10 comprises: an $f_2$ transmitter 81; and $f_1$ receiver 83; an altitude coder 85; an $f_2$ receiver 87; fractional gates 89; a logic system 91; and a CAS indicator 93. The $f_1$ receiver 83 receives $f_1$ synchronizing signals from the satellite and immediately applies control or synchronizing signals to the $f_2$ transmitter 81. The altitude coder 85 receives an altitude signal representing the altitude of the primary aircraft and encodes the $f_2$ signal generated by the $f_2$ transmitter 81 in accordance with the altitude signal. The $f_2$ transmitter transmits the altitude coded $f_2$ signal to other aircraft. The actions up to this point are the same as for the earlier described FIG. 7 embodiment.

In addition to controlling the generation of the coded $f_2$ signal, the $f_1$ receiver 83 also applies a control or initiation signal to the fractional gates 89. The fractional gates receive an input signal from the $f_2$ receiver 87 when the $f_2$ receiver receives a signal from the other aircraft. The signal from the $f_2$ receiver is coded with the altitude of the intruding aircraft in the same manner as the primary aircraft's $f_2$ signal is coded with primary altitude. The fractional gates determine which portion of the overall gating period the intruding aircraft is in. That is, as illustrated in FIG. 9 and heretofore described, the fractional gates determine whether the intruding aircraft is in zone A to B, B to C, or C to D, etc. The fractional gates separate intruder $f_2$ signals into different channels according to the relative delay of the $f_2$ signals, as described previously. In their totality the fractional gates comprise the whole gate and pass only $f_2$ signals from intruders within the set threat detection zone defined by the whole gate. The output signal from the fractional gates 89 is applied to the logic network 91. The logic network receives a second input signal representing the altitude of the primary aircraft.

The logic network compares the altitude of the intruding aircraft with primary aircraft altitude and determines the altitude difference, including the sense of above or below. The logic network also receives $f_2$ signals through the channels from the fractional gates and determines tau values by the counting technique described elsewhere herein. If the altitude difference and tau value of an intruder are less than set thresholds, the logic network sends an appropriate signal to the indicator 93. The signal to the indicator 93 lights the proper light according to whether the intruder is above, at, or below the altitude of the primary aircraft and according to the value of tau obtained. If desired, the system can be a PWI system, and the indicator used will indicate only the numerical result of the altitude comparison and the tau value count. Alternatively, the logic network can perform the threat evaluation described and apply a CAS threat evaluation signal to the CAS indicator 93. The CAS indicator 93 indicates various degrees of threat, such as emergency, warning, or alert, for example, according to the value of tau obtained. It also indicates whether or not the primary aircraft should move up or down.

Analog and digital embodiments of the fractional gates 89 illustrated in FIG. 10 are hereafter described. In general, the fractional gates divide the overall gate into a plurality of sections and determine which section the intruding aircraft is in. The rate of movement or the time for passage of the intruding aircraft through one fractional gate to the next fractional gate can be used to estimate its rate of approach. Alternatively $f_2$ signals through a fractional gate can be counted to determine the value of tau.

Figure 11:
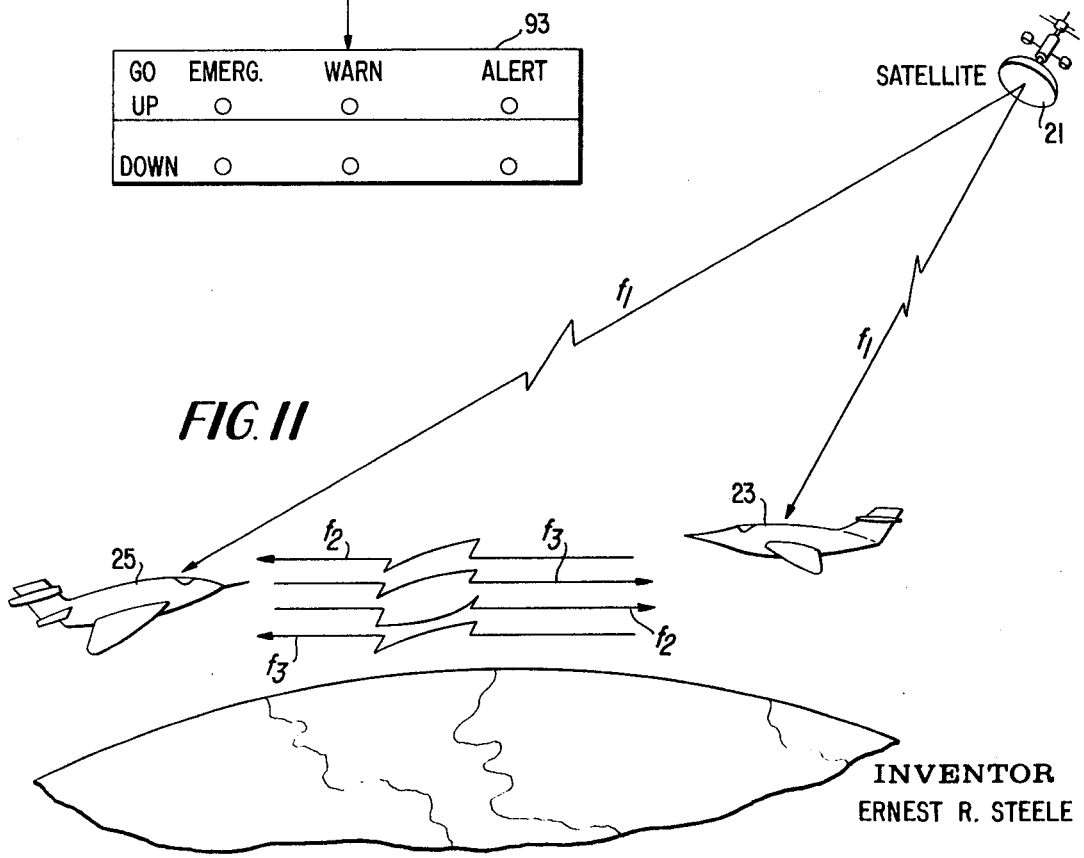
FIG. 11 is a pictorial diagram illustrating a method of true range measurement.

FIG. 11 is a pictorial diagram illustrating a method of the invention that is slightly more sophisticated than the methods and apparatus heretofore discussed. The satellite 21 transmits $f_1$ signals to the primary and intruding aircraft 23 and 25. In response to the $f_1$ synchronizing signal each aircraft generates an $f_2$ response signal and transmits it to the other aircraft. Upon receipt of the $f_2$ response signal, using an $f_2$ receiving gate, if desired, each aircraft transmits an $f_3$ return signal to the aircraft originating the $F_2$ response signal. By the response to an $f_2$ signal with an $f_3$ signal, the said aircraft receiving the $f_3$ signal is provided with sufficient data to accurately determine the distance between the two aircraft. The delay at the primary aircraft of the received $f_3$ signal after the receipt of the $f_1$ signal determines the distance of separation. That is, measuring the length of time between sending the $f_2$ signal and receiving the responding $f_3$ signal results in a value of delay that is a simple measure of the distance between the aircraft. The received $f_3$ signals are gated so as to establish a threat detection zone in the manner as heretofore described for $f_2$ signals. Hence, the method illustrated in FIG. 11 includes the additional step of transmitting a return signal ($f_3$) in response to a received response signal ($f_2$). It will be appreciated by those skilled in the art and others that the method illustrated in FIG. 11 is more exact than the methods heretofore described with respect to determining the distance between the two aircraft. The locus of intruder position is the surface of a sphere, centered on the primary aircraft, rather than the surface of an ellipsoid as heretofore described.

FIG. 12 illustrates an apparatus for carrying out the method illustrated in FIG. 11 and heretofore described. Specifically, the apparatus illustrated in FIG. 12 comprises: $f_2$ and $f_3$ transmitters 101 and 103; $f_1$, $f_2$, and $f_3$ receivers 105, 107, and 109; an altitude coder 111; fractional gates 115; a logic network 117; and a CAS indicator 119.

As heretofore described with respect to FIG. 10, the $f_1$ receiver 105 receives a synchronizing signal from the satellite and applies synchronizing or control signals to the $f_2$ transmitter 101, and to the fractional gates 115. The altitude coder 111 applies a signal representing the altitude of the primary aircraft to the $f_2$ transmitter. Hence, the transmitter 101 transmits an altitude coded $f_2$ signal to intruding aircraft. As previously described, introducing aircraft also generate $f_2$ signals, which are received by the $f_2$ receiver 107. Upon receipt of an $f_2$ signal from an intruding aircraft the $f_2$ receiver 107 on the primary aircraft applies a control signal to the $f_3$ transmitter 103.

The $f_3$ transmitter 103 also receives an altitude code signal from the altitude coder 111. The $f_3$ transmitter transmits the altitude coded $f_3$ signal to the intruding aircraft. The intruding aircraft similarly transmits an altitude coded $f_3$ signal to the primary aircraft. The $f_3$ signal from the intruding aircraft passes through the fractional gates 115 to the logic network 117. The logic network 117 interprets the intruders $f_3$ signal to determine: (1) the altitude difference between the two aircraft; and, (2) the distance between the two aircraft. If the system illustrated in FIG. 12 were a PWI system, this information would be displayed for the pilot. However, because the system illustrated in FIG. 12 is a CAS system, the logic network further compares the information to preselected threshold values to determine what evasive maneuver, if any, the pilot should take to avoid a collision. This information is then displayed on the indicator 119. The urgency of the maneuver derived by the logic network as described heretofore with respect to FIG. 10 is also passed and displayed by the indicator. Hence, the pilot is told whether there is an emergency, warning, or alert situation and whether to go up or down to avoid a collision. If desired, the indicator 119 can be more complex and give the pilot additional directions or greater information.

It will be appreciated from the foregoing description of the method and apparatus of the invention, that the invention is versatile. That is, the general concept of the invention can be made more complicated or less complicated, hence, it is useful on small, inexpensive or large, expensive aircraft. The basic concept of the invention is the use of a satellite to send synchronizing pulses to vehicles. In response to each synchronizing pulse each vehicle transmits a response pulse which is received by other vehicles if the first vehicle is in a predetermined threat detection zone. That is, a gate is provided in each vehicle which passes response signals if the response signals are received within a predetermined period of time. The predetermined period of time is related to the desired threat detection zone. The gating prevents interference and saturation by aircraft. There are numerous embodiments of the invention that incorporate the basic concept. For example, fractional gates can be included to determine in which of a plurality of fractional areas of a threat zone a vehicle is actually present or to measure tau as previously described. Further, the intruding vehicles can provide a further response signal so that an exact indication of the distance between the vehicles can be determined. Altitude comparison between aircraft can be made and indicated or used with the measurement of tau to determined the urgency and best direction of an avoidance maneuver. Directional antenna techniques can be used.

FIGS. 13 and 14 illustrate, respectively, analog and digital apparatus for generating fractional gates and fractionally gating a received signal. The apparatus illustrated in FIG. 13 comprises a plurality of analog fractional gates or channels. The number of channels is determined by the number of fractions into which the threat zone is divided. Three channels are illustrated in FIG. 13, however, it will be appreciated by those skilled in the art and others that a much larger number of channels can be provided; also, that an exponential relationship in the duration of the fractional gates provides a unique simplification in the apparatus for measuring tau.

The first or nearest channel, or fractional gate represented by inside of D of FIG. 9, comprises a first monostable multivibrator 121 and a first gate 123. Each farther out channel (D to C, C to B, etc.) comprises: a second monostable multivibrator 125; a second gate 127; a pulse stretcher 129; a diode 131; and, a capacitor 133. It will be appreciated that the last three elements (i.e., pulse stretcher, the diode and the capacitor) perform a pulse counting function for the second gate 127.

The $f_1$ synchronizing pulse is applied to the trigger input of the first monostable multivibrator 121 causing the first monostable multivibrator to shift from its stable state to its unstable state. This shift applies a gating signal to the first gate 123. The gate 123 has a second input adapted to receive $f_2$ (or $f_3$) pulses from intruding aircraft. If an $f_2$ (or $f_3$) pulse is received during the period of time that the first monostable multivibrator is gating the first gate open, the pulse passes through the gate and is passed to an indicator indicating the presence of an intruder. After a predetermined period of time, the first monostable multivibrator 121 returns to its stable state and closes the first gate 123. Thereafter, no further $f_2$ or $f_3$ pulses can pass through the first gate 121, until reactivation by the next $f_1$ pulse.

When the first monostable multivibrator 121 returns to its stable state, it applies a trigger signal to the second monostable multivibrator 125 of the next fractional gate representing region D to C of FIG. 9. Triggering of the second monostable multivibrator shifts that monostable multivibrator to its unstable state causing a gating signal to be applied to the second gate 127. The second gate passes $f_2$ (or $f_3$) pulses received while it is gated open in the same manner as the first gate passes $f_2$ (or $f_3$) pulses. If an $f_2$ (or $f_3$) pulse is received during the period that the second gate is gated open by the second monostable multivibrator, the pulse is applied to the pulse stretcher 129. The pulse stretcher increases the pulse length thereby adding energy to the pulse. The pulse stretcher applied the stretched pulse through the diode 131 to the capacitor 133. The diode prevents leakage and maintains the charge on the capacitor. The charge on the capacitor is increased for each $f_2$ (or $f_3$) pulse received during the open or activation period of the second gate 127. By a proper choice of the capacitance, a linear voltage-charge relationship is achieved. When the intruder has passed through the zone corresponding to the (D–C) fractional gate, the total charge on the capacitor is a measure of tau, and can be shown on a suitably calibrated voltmeter display. This measurement is equivalent to counting the $f_2$ pulses.

After the second monostable multivibrator 125 returns to its stable state, it applies a trigger signal to the third monostable multivibrator of the next fractional gate (C to B) and the foregoing sequence repeats for that fractional gate. Following that fractional gate, the sequence repeats for the B to A fractional gate. The sum of all the fractional gates represents the total thread detection zone heretofore described.

FIG. 14 illustrates a digital fractional gating apparatus and is suitable for use in the embodiments of the invention heretofore discussed. In general, each $f_1$ pulse starts a register counting pulses generated by a clock. As the count reaches predetermined values, digital switches (AND gates) channel the $f_2$ (or $f_3$) pulses pulses through countdown circuits to appropriate fractional gate registers. The outputs from the fractional gate registers are displayed or "read" by a logic circuit. The logic circuit compares these outputs with threshold values of tau and generates appropriate display signals.

The digital embodiment of the fractional gating apparatus illustrated in FIG. 14 comprises: a clock 151; first, second, third and fourth AND gates 153, 155, 157 and 159; first, second, third and fourth bistable multivibrators 161, 163, 165, and 167; a primary register 169; first, second, third and fourth reference registers 171, 173, 175 and 177; first, second, third and fourth comparators 179, 181, 183 and 185; first, second and third countdown circuits 187, 189 and 191; and first, second and third fractional gate registers 193, 195 and 197. Each of the AND gates are two input AND gates.

The signal from the $f_1$ receiver is connected to the set input of the first bistable multivibrator 151. The output (the on output) which is activated by the application of a signal to the set input of the first bistable multivibrator 161 is connected to one input of the first AND gate 153. The output from the clock 151 is connected to the second input of the first AND gate 153. The output from the first AND gate 153 is connected to the input of the primary register 169. The other output of the first bistable multivibrator 161 is connected to the reset input of the primary register 169.

The output of the primary register 169 is connected to one input of each of the four comparators 179, 181, 183, and 185. The output of the first reference register 171 is connected to the second input of the first comparator 179 and the output of the second referenced register 173 is connected to the second input of the second comparator 181. The output of the first comparator 179 is connected to the reset input of the first bistable multivibrator 161 and to the reset input of the second bistable multivibrator 163. The output of the second comparator 181 is connected to the set input of the second bistable multivibrator 163 and to the reset input of the third bistable multivibrator 165.

The output of the third reference register 175 is connected to the second input of the third comparator 183. The output of the third comparator 183 is connected to the set input of the third bistable multivibrator 265 and to the reset input of the fourth bistable multivibrator 167. The output of the fourth reference register 177 is connected to the second input of the fourth comparator 185. The output of the fourth comparator 185 is connected to the set input of the fourth bistable multivibrator 167.

An input terminal 199 adapted to receive $f_2$ (or $f_3$) signals is connected to one input of the second, third and fourth AND gates 155, 157 and 159. The on output of the second bistable multivibrator 163 is connected to the second input of the second AND gate 155. The output of the second AND gate 155 is connected through the first countdown circuit 187 to the input of the first (outermost) fractional gate register 193. The on output of the third bistable multivibrator 165 is connected to the second input of the third AND gate 157. The output of the third AND gate 157 is connected through the second countdown circuit 189 to the input of the second fractional gate register 195.

The on output of the fourth bistable multivibrator 167 is connected to the second input of the fourth AND gate 159. The output of the fourth AND gate 159 is connected through the third countdown circuit 191 to the input of the third fractional gate register 197.

A reset terminal is connected to the reset inputs of all of the fractional gate registers 193, 195, and 197. The outputs of the fractional gate registers are connected to output terminals which are connected to a display or to the logic of the embodiments of the invention heretofore described.

In operation, the receipt of an $f_1$ pulse triggers the first bistable multivibrator 161 so that the first gate is opened to pass clock pulses from the clock 151. These clock pulses are counted by the primary register 169. As the primary register's count increases it reaches numerical levels that are comparable with the four reference register counts. The lowest reference register count is the fourth reference register 177 which represents the inner boundary of the threat detection zone D-C of FIG. 9. When the count in the primary register 169 reaches the count in the fourth reference register 177 the fourth bistable multivibrator 167 is set. When the fourth bistable multivibrator 167 is set, it gates the fourth AND gate 159 open. When the fourth AND gate 159 is opened it passes $f_2$ (or $f_3$) pulses. Hence, if an intruding aircraft is inside the D-C threat zone its received $f_2$ (or $f_3$) pulse passes through the fourth AND gate and the third countdown circuit to the third register 197. The count in this register is displayed or applied to the logic circuits of the embodiments of the invention heretofore described.

The primary register 169 continues to count clock pulses. When it reaches a count level equal to the count in the third reference register 175, the third comparator 183 generates an output signal. The output signal from the third comparator 183 sets the third bistable multivibrator 165 and resets the fourth bistable multivibrator 167. Resetting the fourth bistable multivibrator 167 closes the fourth AND gate 159. Setting the third bistable multivibrator 165, opens the third AND gate 157. Thereafter, the third AND gate passes $f_2$ (or $f_3$) pulses, if any are received through the second countdown circuit 159 to the second register 195. This portion of the FIG. 14 system represents the C–B region of FIG. 9.

The primary register 169 continues to count until it reaches the pulse count in the second reference register 173. Thereafter, the cycle repeats; that is, the second comparator 181 generates an output pulse which sets the second bistable multivibrator 163 and resets the third bistable multivibrator 165. Hence, the third AND gate is gated off and the second AND gate is gated on to pass $f_2$ (or $f_3$) pulses. The system now has B–A fractional gate of FIG. 9 open.

When the primary register reaches a count comparable to the first reference register 171 count, the first comparator 179 generates an output signal. The output signal from the first comparator 179 resets both the first and the second bistable multivibrators 161 and 163. Resetting the second bistable multivibrator gates the second AND gate 155 off, and resetting the first bistable multivibrator gates the first AND gate 153 off and resets the primary register. Hence, the second AND gate passes no more $f_2$ (or $f_3$) pulses and the first AND gate passes no more clock pulses. At this point a complete cycle for one $f_1$ pulse is complete. Upon the receipt of another $f_1$ pulse the cycle repeats.

It will be appreciated from the foregoing description of the analog and digital embodiments of the fractional gates that these systems divide a single gate into a plurality of fractional sections. The fractions are divided so that they pass $f_2$ (or $f_3$) signals when an aircraft is in a particular fraction of the overall threat zone.

In the preferred embodiments of the invention, if an intruding aircraft is in a particular region an $f_2$ pulse is received from that region for each $f_1$ pulse received from the satellite. These pulses are accumulated in the registers (FIG. 14) or on the capacitors (FIG. 13) resulting in signals that are displayed or readout by the logic circuit. When the intruder has passed from the region of a particular fractional gate, the accumulated value is proportional to tau and can display the value of tau directly. The display may then be reset by the means shown. This level of accumulation is used by the logic circuit to evaluate the threat relative to selected thresholds. In addition, $f_2$ (or $f_3$) signals can be decoded, as previously described, so that information about the intruder's altitude can also be indicated or used by the threat evaluation logic.

FIG. 15 illustrates the inventive solution to a confusion of $f_3$ signals that can occur when a multitude of aircraft are near each other. This problem can easily be understood from FIG. 4. Specifically in FIG. 4 aircraft 3 is outside of aircraft 1's threat zone, however, aircraft 3 generates an $f_3$ return signal in response to an $f_2$ signal from aircraft 2. Under some circumstances this $f_3$ signal could be received by aircraft 1 and be confused with the desired $f_3$ signal from aircraft 2 that is in response to the $f_2$ signal from aircraft 1. This invention provides a method and apparatus for eliminating these spurious signals. FIG. 15 illustrates an embodiment of an apparatus which carries out the method. The method is the step of jittering some of the $f_2$ signals generated by the primary aircraft and only allowing $f_3$ response signals that are correlated to the jitter to be indicated or evaluated.

The embodiment illustrated in FIG. 15 comprises: an $f_1$ receiver 201; a jitter control 203; an altitude coder 205; a mixer 207; an $f_2$ transmitter 209; an $f_3$ receiver 213; fractional gates 215; a logic circuit 217; an indicator 219; an $f_2$ receiver 221; an $f_3$ transmitter 223.

Upon receipt of an $f_1$ pulse signal from the satellite, the $f_1$ receiver applies the $f_1$ signal to the jitter control 203. The jitter control delays some of the $f_1$ signals for varying amounts of time with respect to the time of receipt of those pulses. For example, the jitter control could delay every second $f_1$ pulse by a differing number of microseconds; preferably, the delays are several times the duration of the warning zone gate. The normal output of the jitter control, i.e., the non-shifted pulses are applied to one input (A) of the mixer 207. The jittered output of the jitter control 203 is connected to the second input (B) of the mixer 207 and to the fractional gates 215 to synchronize the gates to the jittered $f_2$ transmission.

The output of the mixer 207 is connected to the signal input of the $f_2$ transmitter 209. Because the mixer applies jittered as well as unjittered signals to the $f_2$ transmitter, both jittered and unjittered $f_2$ signals are transmitted. The $f_3$ signals are reviewed by the $f_3$ receiver 213 and applied to the fractional gates 215. The fractional gates 215 will pass only the $f_3$ signals received in response to the jittered $f_2$ signals because the jittered $f_2$ transmission and the fractional gates are jittered in synchronism. The unjittered $f_2$ transmissions are provided to give collision avoidance information to other aircraft using apparatus previously described. Although an occasional spurious $f_3$ pulse in response to some other aircraft may coincidentally appear and pass a gate, this event would be relatively rare and distinguishable by its rarity and its fleeting appearance.

The $f_3$ signals that pass the gates are conducted to the logic circuits 217 where intruder altitude and other information is decoded and any threat evaluation is made. The processed signals or the results of the evaluation are applied to the indicator 219.

Alternately to the just described method of delaying and jittering a proportion of the received $f_1$ signals, the jitter control 203 may add additional internally generated jittered synchronizing signals to the B input of the mixer 207 and at the same time to the synchronizing input of the fractional gates 215; these additional signals or pulses would be timed to be approximately midway between the received $f_1$ signals.

As in previously described embodiments the altitude coder 205 codes the $f_2$ and $f_3$ transmitted signals. In addition, the embodiment of the invention illustrated in FIG. 15 also includes an $f_2$ receiver for receiving $f_2$ signals from an intruding aircraft. The $f_2$ receiver is connected to the $f_3$ transmitter 223 to generate altitude coded $f_3$ signals.

It will be appreciated from the foregoing description of jitter control that by moving some generated $f_2$ signals with respect to the incoming $f_1$ signals an apparatus for eliminating spurious $f_3$ signals is provided. That is because the $f_2$ pulses generated by the $f_2$ transmitters are shifted relative to the received $f_1$ signals as desired and the gate for receiving the shifted signals resulting from the generated $f_2$ shift is also shifted by the same amount; one shift compensates for the other shift. Because the gates control the passage of $f_3$ signals and because the gates are shifted in accordance with the shift of the $f_2$ signals, spurious $f_3$ signals that are not so shifted are rejected or suppressed. Accordingly, only shifted or jittered $f_3$ return signals in response to the jittered signals generated by the primary aircraft have any significant effect on the indicator display or on the evaluation by the logic.

FIG. 16 is a block diagram of an apparatus, illustrating a method for providing greater accuracy in the resolution of intruder signal ($f_2$) delay relative to the received synchronizing $f_1$ signals used for delay reference. The performance of the present invention is related to the time resolution or accuracy obtainable from the $f_1$ signals. Hence, any improvement in that time resolution will provide for greater accuracy and sensitivity in intruder threat evaluation allowing the use of narrower possible fractional gates, or on the other hand, it would allow a reduction in the $f_1$ transmitted bandwith needed for a given level of performance, with commensurate saving in needed frequency allocation and cost.

The method and apparatus illustrated in FIG. 16 establish an average value of the intersignal time of a large number of $f_1$ signals, for example 100 pulses, and provide a substitute repetitive signal that has an intersignal time equal to this average. This substitute signal has greater stability and available time resolution in each pulse than is true for the transmitted $f_1$ signal. In fact, a transmitted $f_1$ pulse can be missing completely without appreciable effect on the performance of the invention.

The FIG. 16 embodiment uses a controllable-frequency oscillator (VCO) to develop a split gate. When the $f_1$ pulse is applied to the split gate, part of the pulse passes through each half of the gate. The two portions of the signal from the gate halves are compared, for example, by a differential amplifier. The output of the amplifier is a measure of the ratio of the energies in the two parts of the pulse. This output is integrated over a time that gives the desired duration of averaging $f_1$ pulses. The integrated output then controls the oscillator so that the split gate is positioned symmetrically in time on the average position of the $f_1$ pulse. An output of the split gate generator can then be differentiated to provide the synchronizing signal having greater time resolution.

More specifically, the embodiment illustrated in FIG. 16 comprises: an $f_1$ receiver 225; a controllable frequency oscillator 227; a split gate generator 229; a split gate 231; a differential amplifier 233; an integrating circuit 235; and a differentiating circuit 237.

The output of the oscillator 227 is connected to the split gate generator 229, which develops therefrom a split gate having a repetition frequency that is nearly equal to the repetition frequency of the $f_1$ signal. The two parts of the split gate waveform are applied to the split gate 231. Upon receipt of an $f_1$ signal from the satellite, the $f_1$ receiver 225 applies the $f_1$ pulse to the split gate 231. The two split portions of the $f_1$ pulse are conducted to the differential amplifier 233, whose output is then a measure of the degree of signal equality at its input. This output is applied through the integrator circuit 235, which provides the desired time averaging, to the controllable-frequency oscillator 227 in the way that shifts the split gate to a position in time over the average position of the $f_1$ pulse. One of the outputs of the split gate generator is connected to the differentiator 237. The differentiated output is then applied to the embodiments of the invention heretofore described, in lieu of the $f_1$ receiver output.

It will be appreciated from the foregoing description that the method and apparatus illustrated by FIG. 16 provide a substitute $f_1$ synchronizing signal that has the same repetition rate as the $f_1$ signal and can be used in place of the $f_1$ receiver output in the concepts and embodiments heretofore described. It will be further appreciated that when so substituted, the greater stability and accuracy of synchronism between aircraft so obtained will permit greater accuracy and sensitivity in evaluation and indication of the collision threat. Alternatively, the transmitted $f_1$ signal frequency bandwith can be less for a given accuracy of synchronism.

It will be appreciated from the foregoing description that the invention is an apparatus for either warning a pilot of a mid-air collision danger or telling the pilot what evasive action to take to avoid a mid-air collision, and when to take it. The first system is a proximity warning indication system (PWI) and the second is a collision avoidance system (CAS). In either case the invention is versatile and suitable for use on small, inexpensive aircraft or large, expensive aircraft. The least expensive and least complicated embodiments provide minimum information, while the more expensive and more complicated embodiments provide a greater amount or more sophisticated information. It is because of its versatility that the invention can be utilized on small private aircraft as well as on large commercial aircraft.

It will also be appreciated that only preferred embodiments of the invention have been illustrated and that other embodiments fall within the scope of the invention. For example, more fractional gates than those illustrated in FIGS. 14 and 15 can be used by the inventive system. Hence, the invention can be practiced otherwise than as specifically described herein.

What is claimed is:

1. A method of warning the operator of a vehicle of intruding vehicles comprising the steps of:
   transmitting synchronizing signals from a satellite to said vehicles;
   receiving said synchronizing signals by each of said vehicles;
   transmitting response signals by each of said vehicles in response to said synchronizing signals;
   opening a receiving gate in each of said vehicles for said response signal, in response to said synchronizing signals; and,
   closing said receiving gate after a predetermined period of time to prevent the passage through said gate of any response signals that are received after said predetermined period of time has passed.

2. A method of warning the operator of a vehicle of intruding vehicles as claimed in claim 1 including the additional step of displaying information derived from response signals passing through said gate prior to closing said gate.

3. A method of warning the operator of a vehicle of intruding vehicles as claimed in claim 2 including the additional step of coding information onto said response signals.

4. A method of warning the operator of a vehicle of intruding vehicles as claimed in claim 3 wherein said response signals are coded with altitude information.

5. A method of warning the operator of a vehicle of intruding vehicles as claimed in claim 2 including the additional step of determining the direction of a vehicle generating a response signal from the vehicle receiving the response signal.

6. A method of warning the operator of a vehicle of intruding vehicles as claimed in claim 2 including the step of dividing said receiving gate into a plurality of fractional gate sections.

7. A method of warning the operator of a vehicle of intruding vehicles as claimed in claim 6 including the step of dividing the information derived from said response signals in accordance with the outputs of said fractional gate sections.

8. A method of warning the operator of a vehicle of intruding vehicles as claimed in claim 6 including the additional step of counting the response signals passing through each fractional gate section of said receiving gate.

9. A method of warning the operator of a vehicle of intruding vehicles as claimed in claim 8 including the additional step of evaluating the response signals passing through said receiving gate fractions so as to determine tau.

10. A method of warning the operator of a vehicle of intruding vehicles as claimed in claim 9 wherein said evaluation step includes the step of comparing the altitude of the vehicle receiving said response signals with the altitude coded response signals received from other vehicles.

11. A method of warning the operator of a vehicle of intruding vehicles as claimed in claim 10 wherein said evaluation is logically performed to provide a tau count.

12. A method of warning the operator of a vehicle of intruding vehicles as claimed in claim 8 including the step of generating further response signals in response to the receipt of response signals.

13. A method of warning the operator of a vehicle of intruding vehicles as claimed in claim 12 including the additional step of jittering the response signal in a predetermined manner and jittering a receiving means for receiving said further response signal in the same manner.

14. A method of warning the operator of a vehicle of intruding vehicles as claimed in claim 13 including the additional step of averaging the synchronizing signals received from the satellite.

15. Apparatus for warning the operator of a vehicle of intruding vehicles comprising:
   a satellite, said satellite transmitting synchronizing signals to said vehicle;
   receiving means located onboard each of said vehicles for receiving said synchronizing signals;
   transmitting means located onboard each of said vehicles for transmitting a response signal in response to said synchronizing signal; and
   receiving gate means located onboard each of said vehicles for receiving response signals from other vehicles, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

16. Apparatus for warning the operator of a vehicle of intruding vehicles as claimed in claim 15 including display means for displaying information derived from response signals passing through said receiving gate means prior to the closing of said receiving gate means, said display means being connected to said receiving gate means.

17. Apparatus for warning the operator of a vehicle of intruding vehicles as claimed in claim 16 including coding means connected to said transmitting means for coding information onto said response signals.

18. Apparatus for warning the operator of a vehicle of intruding vehicles as claimed in claim 17 wherein said response signals are coded with altitude information.

19. Apparatus for warning the operator of a vehicle of intruding vehicles as claimed in claim 16 including means connected to said receiving gate means for determining the direction of a vehicle generating response signals from the vehicle receiving the response signals.

20. Apparatus for warning the operator of a vehicle of intruding vehicles as claimed in claim 16 wherein said receiving gate means is divided into a plurality of fractional gate sections.

21. Apparatus for warning the operator of a vehicle of intruding vehicles as claimed in claim 20 wherein said display means is divided into a plurality of sections equal to said fractional gate sections so as to display information for each fractional gate section.

22. Apparatus for warning the operator of a vehicle of intruding vehicles as claimed in claim 20 including counting means for counting the response signals passing through each fractional gate section of said receiving gate means, said counting means being connected to said fractional gate sections of said receiving gate means.

23. Apparatus for warning the operator of a vehicle of intruding vehicles as claimed in claim 22 including evaluating means connected to said fractional gate sections for evaluating the response signals passing through said fractional gate sections of said receiving gate means so as to determine tau.

24. Apparatus for warning the operator of a vehicle of intruding vehicles as claimed in claim 23 wherein said evaluation means includes means for comparing the altitude of the vehicle receiving said response signals with the altitude coded response signals received from other vehicles.

25. Apparatus for warning the operator of a vehicle of intruding vehicles as claimed in claim 24 wherein said evaluation means includes logic elements adapted to perform a tau count.

26. Apparatus for warning the operator of a vehicle of intruding vehicles as claimed in claim 22 including a second transmitting means connected to said receiving gate means for generating a further response signal in response to the receipt of a response signal.

27. Apparatus for warning the operator of a vehicle of intruding vehicles as claimed in claim 26 including jitter means for jittering said response signal in a predetermined manner and means for jittering said receiving gate means in the same manner.

28. Apparatus for warning the operator of a vehicle of intruding vehicles as claimed in claim 27 including averaging means for averaging the synchronizing signals received from the satellite prior to applying said signals to said receiving means.

29. Apparatus mountable onboard a vehicle for warning the operator of the vehicle of intruding vehicles comprising:
   receiving means receiving synchronizing signals from a satellite;
   transmitting means for transmitting a response signal in response to said synchronizing signal; and,
   receiving gate means for receiving response signals from other vehicles, said receiving gate means including a gate for passing said response signals, said gate being open for a predetermined period of time in response to received synchronizing signals to allow the passage of response signals and closed after said predetermined period of time has elapsed to prevent the passage of any response signals received after said predetermined period of time has elapsed.

30. Apparatus mountable onboard a vehicle for warning the operator of the vehicle of intruding vehicles as claimed in claim 29 including display means for displaying information derived from response signals passing through said receiving gate means prior to the closing of said receiving gate means, said display means being connected to said receiving gate means.

31. Apparatus mountable onboard a vehicle for warning the operator of the vehicle of intruding vehicles as claimed in claim 30 including coding means connected to said transmitting means for coding information onto said response signals.

32. Apparatus mountable onboard a vehicle for warning the operator of the vehicle of intruding vehiches as claimed in claim 31 wherein said response signals are coded with altitude information.

33. Apparatus mountable onboard a vehicle for warning the operator of the vehicle of intruding vehicles as claimed in claim 30 including means connected to said receiving gate means for determining the direction of a vehicle generating response signals from the vehicle receiving the response signals.

34. Apparatus mountable onboard a vehicle for warning the operator of the vehicle of intruding vehicles as claimed in claim 30 wherein said receiving gate means is divided into a plurality of fractional gate sections.

35. Apparatus mountable onboard a vehicle for warning the operator of the vehicle of intruding vehicles as claimed in claim 34 wherein said display means is divided into a plurality of sections equal to said fractional gate sections so as to display information for each fractional gate section.

36. Apparatus mountable onboard a vehicle for warning the operator of the vehicle of intruding vehicles as claimed in claim 34 including counting means for counting the response signals passing through each fractional gate section of said receiving gate means, said counting means being connected to said fractional gate sections of said receiving gate means.

37. Appartus mountable onboard a vehicle for warning the operator of the vehicle of intruding vehicles as claimed in claim 36 including evaluating means connected to said fractional gate sections for evaluating the response signals passing through said fractional gate sections of said receiving gate means so as to determine tau.

38. Apparatus mountable onboard a vehicle for warning the operator of the vehicle of intruding vehicles as claimed in claim 37 wherein said evaluation means includes means for comparing the altitude of the vehicle receiving said response signals with the altitude coded response signals received from other vehicles.

39. Apparatus mountable onboard a vehicle for warning the operator of the vehicle of intruding vehicles as claimed in claim 38 wherein said evaluation means includes logic elements adapted to perform a tau count.

40. Apparatus mountable onboard a vehicle for warning the operator of the vehicle of intruding vehicles as claimed in claim 36 including a second transmitting means connected to said receiving gate means for generating a further response signal in response to the receipt of a response signal.

41. Apparatus mountable onboard a vehicle for warning the operator of the vehicle of intruding vehicles as claimed in claim 40 including jitter means for jittering said response signal in a predetermined manner and means for jittering said receiving gate means in the same manner.

42. Apparatus mountable onboard a vehicle for warning the operator of the vehicle of intruding vehicles as claimed in claim 41 including averaging means for averaging the synchronizing signals received from the satellite prior to applying said signals to said receiving means.

References Cited

UNITED STATES PATENTS

| | | | |
|---|---|---|---|
| 3,384,891 | 5/1968 | Anderson | 434—100(SAT)X |
| 3,430,234 | 2/1969 | Wright | 343—6 |

RODNEY D. BENNETT, JR., Primary Examiner

R. E. BERGER, Assistant Examiner

U.S. Cl. X.R.

343—6, 7.3, 100